United States Patent
Papziner et al.

(10) Patent No.: US 9,136,571 B2
(45) Date of Patent: Sep. 15, 2015

(54) DRIVER ASSISTANCE DEVICE FOR A VEHICLE, VEHICLE AND METHOD FOR OPERATING A RADAR APPARATUS

(75) Inventors: Uwe Papziner, Bietigheim-Bissingen (DE); Frank Kuenzler, Kraichtal (DE)

(73) Assignee: Valeo Schalter Und Sensoren GmbH, Bietigheim-Bissingen (DE)

( * ) Notice: Subject to any disclaimer, the term of this patent is extended or adjusted under 35 U.S.C. 154(b) by 207 days.

(21) Appl. No.: 13/696,904

(22) PCT Filed: Mar. 22, 2011

(86) PCT No.: PCT/EP2011/054298
§ 371 (c)(1), (2), (4) Date: Nov. 30, 2012

(87) PCT Pub. No.: WO2011/141210
PCT Pub. Date: Nov. 17, 2011

(65) Prior Publication Data
US 2013/0063297 A1    Mar. 14, 2013

(30) Foreign Application Priority Data
May 10, 2010 (DE) .......................... 10 2010 020 022

(51) Int. Cl.
*G01S 13/93* (2006.01)
*H01P 1/22* (2006.01)
(Continued)

(52) U.S. Cl.
CPC ................. *H01P 1/227* (2013.01); *G01S 7/032* (2013.01); *G01S 13/87* (2013.01); *G01S 13/931* (2013.01);
(Continued)

(58) Field of Classification Search
CPC ....... G01S 13/931; G01S 13/34; G01S 13/24; G01S 13/32; G01S 13/52; G01S 13/53; G01S 13/534; G01S 13/536; G01S 13/56; G01S 13/58; G01S 13/586; G01S 13/70; G01S 13/726; G01S 13/767; G01S 13/86; G01S 13/91; G01S 2013/936; G01S 2013/9375; G01S 2013/9339; G01S 2013/9353; G01S 2013/9357; G01S 7/4052; G01S 7/032; G01S 7/4026; G01S 7/4021; G01S 2007/403; G01S 2007/4034; G01S 2007/4086; G01S 2007/4069; G01S 13/87; G01S 2013/9389; G01S 2013/9378; G01S 13/4454; G01S 2013/9332; B82Y 25/00; G01R 33/093; G11B 5/3903; G11B 5/398; G11B 5/3983; G11B 5/66; G11C 11/16; H01L 27/224; H01L 27/228; H01L 43/08; H01Q 17/00; H01Q 17/004; H01Q 15/0026; H01Q 1/3233; H01Q 3/28; H01Q 21/065; H01Q 25/00; B64G 1/52; B64G 9/00; H01P 1/227; H01P 1/184; H01P 5/15
USPC ................ 342/70, 71, 72, 175, 198, 700 MS; 340/435, 436, 903; 701/301
See application file for complete search history.

(56) References Cited

U.S. PATENT DOCUMENTS 3,742,392 A    6/1973   Schwarzmann
4,001,823 A *  1/1977   Matsui et al. ................... 342/90
(Continued)

FOREIGN PATENT DOCUMENTS

EP    0 083 476    7/1983
EP    2 071 670    6/2009
(Continued)

OTHER PUBLICATIONS
International Search Report of the ISA for PCT/EP2011/054298 dated Jul. 7, 2011.
(Continued)

*Primary Examiner* — John B Sotomayor
(74) *Attorney, Agent, or Firm* — Daly, Crowley, Mofford & Durkee, LLP (57) ABSTRACT

The invention relates to a driver assistance device (2) for a vehicle (1), having a radar apparatus (3, 4) for detecting objects which are external to the vehicle, which radar apparatus (3, 4) has an antenna unit (14) for irradiating and/or receiving electromagnetic waves ($S_0$, $S_E$) and a damping element (24, 25, 26) which is coupled to the antenna unit (14) and has the purpose of directing and damping the electromagnetic waves ($S_0$, $S_E$), by means of which damping element (24, 25, 26) the antenna unit (14) can be coupled to a transmitter and/or receiver device (16, 17) of the radar apparatus (3, 4), wherein the damping element (24, 25, 26) has a branching unit (31) with a first line branch (32) for directing the damped electromagnetic waves ($S_0$, $S_E$) between the transmitter and/or receiver device (16, 17), on the one hand and the antenna unit (14) on the other, as well as a second line branch (33) which is coupled to the first line branch (32) and is terminated with a reflection-free terminating element (35, 37). The invention also relates to a corresponding method.

20 Claims, 4 Drawing Sheets

(51) Int. Cl.

| | | |
|---|---|---|
| *G01S 7/03* | (2006.01) | |
| *G01S 13/87* | (2006.01) | |
| H01P 1/18 | (2006.01) | |
| H01P 5/12 | (2006.01) | |
| H01Q 1/32 | (2006.01) | |
| H01Q 3/28 | (2006.01) | |
| H01Q 21/06 | (2006.01) | |
| H01Q 25/00 | (2006.01) | |
| *G01S 13/44* | (2006.01) | |

(52) U.S. Cl.
CPC ....... *H01P 1/184* (2013.01); *H01P 5/12* (2013.01); *H01Q 1/3233* (2013.01); *H01Q 3/28* (2013.01); *H01Q 21/065* (2013.01); *H01Q 25/00* (2013.01); *G01S 13/4454* (2013.01); *G01S 2013/9332* (2013.01); *G01S 2013/9378* (2013.01); *G01S 2013/9389* (2013.01)

(56) References Cited

U.S. PATENT DOCUMENTS

| | | | | |
|---|---|---|---|---|
| 4,044,358 | A | * | 8/1977 | Manning et al. .................. 342/2 |
| 4,241,348 | A | * | 12/1980 | Yatsuka et al. ................ 342/200 |
| 4,673,937 | A | * | 6/1987 | Davis ............................. 342/72 |
| 4,742,354 | A | * | 5/1988 | Wen et al. ...................... 342/188 |
| 4,958,166 | A | * | 9/1990 | Branigan et al. .............. 343/771 |
| 5,055,806 | A | * | 10/1991 | Hansen et al. ............. 333/22 R |
| 5,392,051 | A | * | 2/1995 | Uematsu et al. .............. 342/165 |
| 6,094,158 | A | * | 7/2000 | Williams ........................ 342/70 |
| 6,160,506 | A | * | 12/2000 | Pellon ............................ 341/143 |
| 2002/0105456 | A1 | * | 8/2002 | Isaji .............................. 342/165 |
| 2005/0285579 | A1 | * | 12/2005 | Yasukouchi et al. .......... 323/282 |
| 2006/0132350 | A1 | * | 6/2006 | Boltovets et al. ............... 342/70 |
| 2008/0165049 | A1 | | 7/2008 | Wakayama et al. |
| 2008/0311431 | A1 | * | 12/2008 | Fuji et al. ...................... 428/836 |

FOREIGN PATENT DOCUMENTS

| | | |
|---|---|---|
| JP | 04-127701 | 4/1992 |
| JP | 08-321704 | 12/1996 |
| JP | 2009-182580 | 3/2009 |

OTHER PUBLICATIONS

Bozmarov, et al.; "Application of Microwave Absorbers in Multilayer Antenna Arrays;" Microwaves, Radar and Wireless Communications; 2002; MIKON-2002; 14th International Conference; May 20-22, 2002; pp. 914-917.

Rigoland, et al; "Wide-Band Planar Arrays for Radar Applications;" Phase Array Systems and Technologies, 1996; IEEE International Symposium; Oct. 15-18, 1996; pp. 163-167.

German Search Report dated Jan. 10, 2011; File Reference No. 10 2010 020 022.2; 7 pages.

Decision of Rejection dated Jan. 30, 2015 for Japanese Application No. 2013-509481; 7 pages.

Preliminary Notice of Reasons for Rejection dated Apr. 24, 2014 for Japanese Application No. 2013-509481; 8 pages.

* cited by examiner

DRIVER ASSISTANCE DEVICE FOR A VEHICLE, VEHICLE AND METHOD FOR OPERATING A RADAR APPARATUS

CROSS REFERENCE TO RELATED APPLICATIONS

This application is a National Stage application of PCT/EP2011/054298 filed on Mar. 22, 2011 and published in the German language, and entitled "DRIVER ASSISTANCE DEVICE FOR A VEHICLE, VEHICLE AND METHOD FOR OPERATING A RADAR APPARATUS" which claims priority to German application DE 10 2010 020 022.0 filed on May 10, 2010.

The invention relates to a driver assistance device for a vehicle, which comprises a radar apparatus for detecting objects which are external to the vehicle. The radar apparatus has an antenna unit for radiating and/or receiving electromagnetic waves as well as a damping element which is coupled to the antenna unit and has the purpose of directing and damping the electromagnetic waves. The antenna unit can be coupled to a transmitter and/or receiver device of the radar apparatus via the damping region. The invention also relates to a vehicle having such a driver assistance device as well as to a method for operating a radar apparatus in a vehicle.

The emphasis here is on the damping element which serves to damp the electromagnetic waves. In the prior art, such damping elements are used, in particular, in transmission antenna groups in which an oscillation of the main lobe of the directional characteristic is implemented electronically (beam forming) or switching over is implemented between various directions of the main lobe (beam switching), also electronically. In the prior art, a multiplicity of antenna units are used, and each antenna unit includes one or more individual antenna elements and is fed separately, that is to say independently of the other antenna units. The antenna units, which, for example, can be arranged one next to the other, are each fed with a high-frequency signal. The level of the signals increases from a central antenna unit, for example a centre of the antenna group, symmetrically towards the antenna units which are located at the respective edges. This is necessary to suppress the secondary lobes of the antenna characteristic to less than −13 dB with respect to the main lobe. Otherwise, when all the antenna units are excited with signals of the same level (referred to as "boxcar excitation") it is at most possible to achieve suppression of secondary lobes of −13 dB. Damping elements (also known by the term "attenuator") are used particularly for the purpose of reducing the level for the individual antenna units lying outside the centre. Said antenna units must have a correct, stable damping value and, above all, must not have any phase shift with respect to one another.

Damping elements can be implemented by using resistance paste, for example when the antenna units are manufactured in LTCC (Low Temperature Cofired Ceramics) technology. It is also known to use resistance foils which can be used in damping elements. However, the damping elements which are constructed with a resistance paste or a resistance foil have considerable variations of the resistance values owing to process tolerances or process inaccuracies. For high-frequency substrates there has hitherto been no method for setting damping values by applying a resistance paste or a resistance foil with extremely high accuracy or with low tolerance.

High-accuracy damping elements, specifically in SMD (Surface-Mounted Device) technology are already known from the prior art. However, such components are comparably expensive.

A further possibility is to use π or T damping elements which are implemented by means of three resistors. However, these damping elements cannot be manufactured with sufficient accuracy in the frequency domain of radar apparatuses, for example 24 GHz. In particular, the phase shift of each damping element cannot be achieved in a reproducible fashion in this alternative, owing to the need for the use of SMD resistors.

The object of the invention, is to indicate a way of constructing a damping element for a radar apparatus of a driver assistance device of the generic type mentioned at the beginning without an acceptable expenditure and of a very high degree of accuracy with respect to the damping value and the phase shift.

This object is achieved according to the invention by means of a driver assistance device having the features according to patent Claim 1, as well as by a vehicle having the features according to patent Claim 8, as well as a method having the features according to patent Claim 9. Advantageous embodiments of the invention are the subject matter of the dependent patent claims and of the description.

An inventive driver assistance device for a vehicle comprises a radar apparatus for detecting objects which are external to the vehicle. The radar apparatus comprises an antenna unit for irradiating and/or receiving electromagnetic waves and a damping element which is coupled to the antenna unit and has the purpose of directing and damping the electromagnetic waves. The antenna unit can be coupled to a transmitter and/or receiver device of the radar apparatus via the damping element. The damping element comprises a branching unit with a first line branch for directing the damped electromagnetic waves between the transmitter device and/or receiver device, on the one hand, and the antenna unit, on the other, as well as a second line branch which is coupled to the first line branch and is terminated with a reflection-free terminating element.

The effect according to the invention is therefore achieved by means of a damping element having a branching unit by means of which a portion of the power of the electromagnetic waves cars, be tapped and diverted, specifically to a reflection-free terminating element. The branching unit therefore assumes the function of dividing the power of the electromagnetic waves. The first line branch is used to feed the antenna unit, while the second line branch is terminated with the reflection-free terminating element and therefore serves to annihilate the tapped portion of the power.

The procedure according to the invention has various advantages: the damping element can be manufactured cost-effectively; all that is necessary are two line branches—for example two strip lines—and a reflection-free terminating element. Furthermore, there is no need to use any discrete components, such as SMD components, any resistance paste or any resistance film in the first line branch, that is to say the signal branch of the antenna unit. This avoids inaccuracies in the phase shifting of the damping element as well as in its damping value, which leads in the prior art to degradation of the directional characteristic and therefore of the entire efficiency of the radar apparatus. In series production, the risk of deviations of the phase shift and of the damping value of individual damping elements front set point values is therefore reduced to a minimum. The branching unit can in fact be implemented by means of line structures, for example conductor track structures on a circuit board, which can be manufactured extremely precisely, which ensures constant properties during large-scale series production. The costs incurred in manufacturing the branching unit are very low, since no specific or expensive high-frequency components, materials or processes are required.

The branching unit is preferably implemented in strip conductor technology, in particular in microstrip technology. The first and the second line branches are then each a strip line, in particular a microstrip line. However, it is also possible to provide other types of strip lines, for example coplanar lines and the like. The embodiment of the branching unit in strip conductor technology ensures, in particular when patch antennas are used, that there is a compact and space-saving damping element. Strip lines are also more cost-effective than other wave lines and can be fabricated in a way which permits them to be reproduced with high accuracy and can be manufactured in a materially economical fashion. This proves particularly advantageous, in particular, when there are a multiplicity of antenna units which, apart from the central antenna units, each require a damping element. In fact, a multiplicity of branching units with, the same phase properties and extremely precise damping values are then necessary.

It proves particularly advantageous if the branching unit has a parallel branch (also known by the designation "T-junction" or "Power divider"). The first and the second line branches are then connected electrically. This embodiment ensures a particularly compact damping element. The damping element can therefore also be used in such radar apparatuses in which there is relatively little space available between the individual antenna units which are mounted on a common substrate. A parallel branch also has the advantage that the desired, damping value of the damping element can be implemented particularly accurately without much expenditure; as a result of suitable selection of the line impedances of the first and the second line branches, and to be more precise of the respective $\lambda/4$ transformers, the desired power distributions can be implemented. The impedance adaptation can be achieved in a parallel branch without much expenditure, by using $\lambda/4$ transformers. It is advantageous if at least one section of the respective $\lambda/4$ transformers is embodied in the form of an annular segment or loop, and the branching unit is then particularly compact.

In one alternative embodiment, the branching unit has a directional coupler, specifically, in particular, a TEM (transverse electro-magnetic) line coupler or a hybrid coupler (also known by the terms "4×$\lambda/4$ line coupler" or "branch line coupler" or "90° ring hybrid"). In the case of a TEM line coupler, the first line branch is electrically isolated from the second line branch and is arranged parallel to the second line branch. With such directional couplers it is also possible to tap a portion of the power of the electromagnetic waves and divert it to the reflection-free terminating element.

The reflection-free terminating element is located in the second line branch and therefore does not influence the phase of the signal transmitted via the first line branch. The terminating element can therefore in principle be implemented in any desired fashion; all that is necessary is for no appreciable reflections to take place at the terminating element. The "reflection-free terminating element" is understood to mean, in particular, one in which the power reflections are less than −10 dB, in particular less than −15 dB, even more preferably less than −20 dB. In terms of the reflection-terminating element, a wide variety of embodiments are appropriately possible:

The terminating element can have a resistor which is connected to a reference potential, that is to say to earth, via an electrical short-circuiting element. If the second line branch is a microstrip line, the short-circuiting element is an element which extends through a substrate and which connects the resistor electrically to a grounding surface (a via). In this way it is possible to make available a reflection-free terminating element without a large amount of expenditure, and the resistor can be an SMD component, a resistance paste and/or a resistance film.

The terminating element can, however, also be an absorber which is electrically isolated from a reference potential or is massless. There is then no need to use a short-circuiting element. Such an absorber may be made available, for example, in the form of an absorber wedge, a helical, absorber, a resonant absorber or a resistance coating. All the abovementioned types of absorber do not have a reflection factor.

The radar apparatus can have at least four antenna units, for example eight antenna units. At least two antenna units can be respectively coupled to the transmitter and/or receiver device of the radar apparatus via a specified damping element. The respective damping elements can have different damping values. In one implementation of this embodiment, the radar apparatus can contain an antenna group with eight antenna units which each have a multiplicity of patch antenna elements. Each antenna unit can be coupled separately to the transmitter and/or receiver device. The two outermost antenna units can each be coupled to the transmitter and/or receiver device via such a damping element which has the largest damping value. The two central antenna units are preferably not coupled to the transmitter and/or receiver device via damping elements; the length of the wavelines which couple the central antenna units to the transmitter and/or receiver device should merely preferably be adapted, and therefore their phase shift should merely preferably be adapted to the phase shift of the damping elements. The antenna units which are adjacent to the central antenna units towards the outside are each preferably coupled to the transmitter and/or receiver device via such a damping element which has the smallest damping value. The antenna units which are adjacent to the outermost antenna units towards the inside are each coupled to such a damping element which has a central damping value. A level distribution of the signals which is symmetrical with respect to the central antenna units is therefore present.

A continuous wave radar which is designed to irradiate a frequency-modulated continuous electromagnetic wave (also referred to by the term FMCW (frequency modulated continuous wave) radar is used as the radar apparatus. With such a radar apparatus it is possible to determine the distance between an object and said radar apparatus, as well as the relative speed of the object with respect to the radar apparatus as well as the relative position. The radar apparatus can contain a transmission antenna device and a reception antenna device which is separate therefrom. The specified damping element is preferably used for the transmission antenna device. The antenna unit is then coupled to a transmitter device via the damping element, while the reception antenna device is coupled to a receiver device. Such a receiver device may comprise, for example, a mixer, a low-pass filter, a low-noise amplifier and an analogue-to-digital converter. The signals received by the reception antenna device are then mixed, down into the baseband in the receiver device, low-pass filtered and subjected to analogue-to-digital conversion or discretized. The transmission antenna device can be fed by means of a local oscillator for the generation of a transmission signal. The transmission signal can also be supplied to the mixer in the receiver device in order to mix the received signals down into the baseband. The transmission antenna device can be phase-controlled in the vehicle, at least in the azimuthal direction, in order to be able to detect overall a relatively wide azimuth angle range with a narrow main lobe of the directional characteristic in the horizontal direction.

A vehicle according to the invention, in particular a car, comprises a driver assistance device according to the invention or a preferred refinement thereof.

A method according to the invention is configured for operating a radar apparatus of a driver assistance device in a vehicle. The electromagnetic waves are irradiated and/or received by an antenna unit of the radar apparatus and directed and damped by means of a damping element which is coupled to the antenna unit and by means of which the antenna unit is coupled to a transmitter and/or receiver device of the radar apparatus. The electromagnetic waves are directed via a first line branch of a branching unit of the damping element between the transmitter and/or receiver device, on the one hand, and the antenna unit, on the other, and to a reflection-free terminating element via a second line branch which is coupled to the first line branch.

The preferred embodiments which are shown with respect to the driver assistance device according to the invention, and the advantages thereof, apply correspondingly to the vehicle according to the invention and to the method according to the invention.

Further advantages of the invention can be found in the claims, the figures and the description of the figures. All the features and feature combinations mentioned, above in the description and the features and feature combinations which are mentioned below in the description of the figures and/or simply shown in the figures can be used not only in the respectively specified combination but also in other combinations or else in isolation.

The invention will now be explained in more detail with reference to individual preferred exemplary embodiments, as well as with reference to the appended drawings, in which.

In the figures, identical and functionally identical elements are provided with the same reference symbols.

Figure 1:
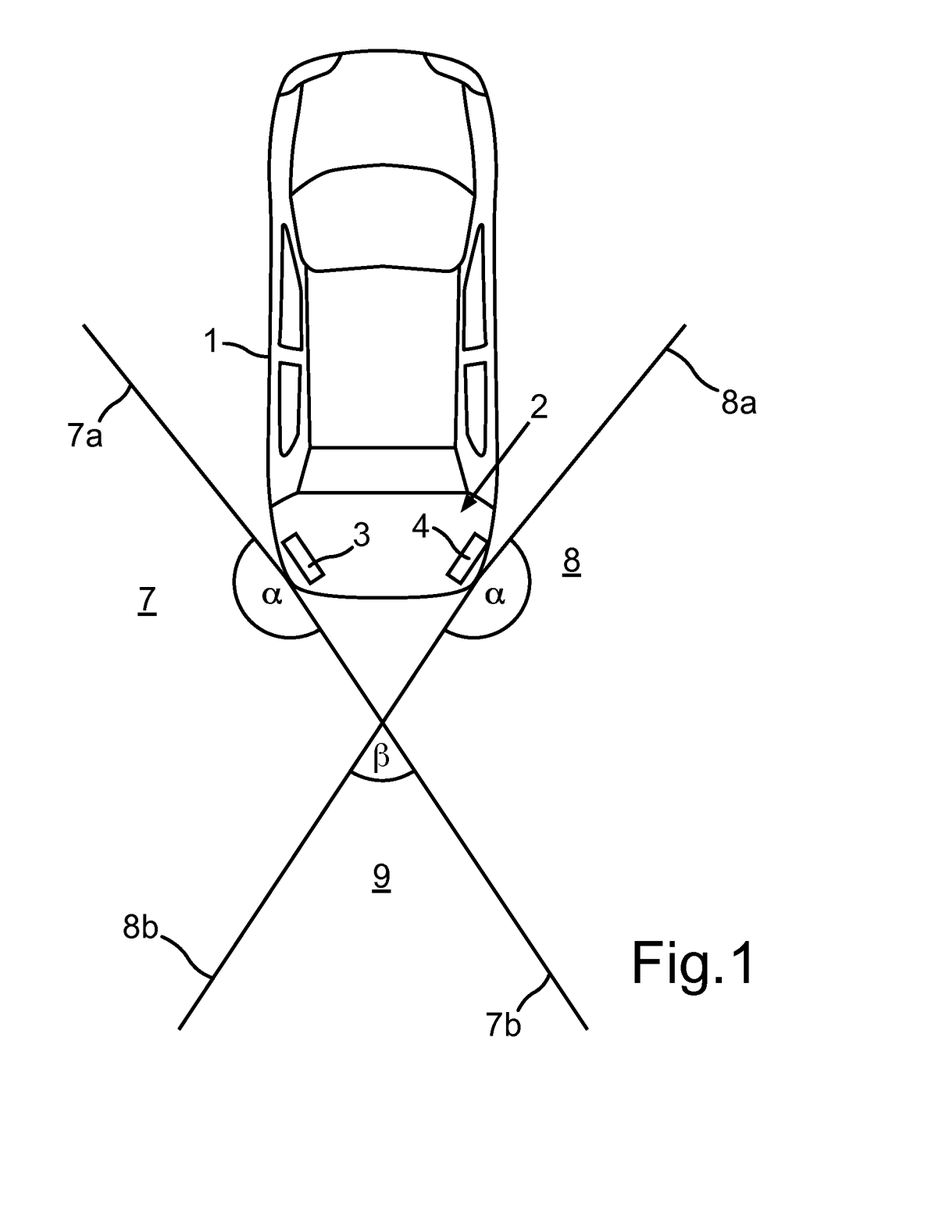
FIG. 1 is a schematic illustration of a plan view of a motor vehicle according to an embodiment of the invention.

A motor vehicle 1 which is illustrated in FIG. 1 comprises a driver assistance device 2 which assists the driver in driving the motor vehicle 1. The driver assistance device 2 may be, for example, a monitoring system for the blind spot and/or an accident early detection system, in particular for rear-end collisions and/or an ACC (Adaptive Cruise Control) system. The driver assistance device 2 comprises a first radar apparatus 3 as well as a second radar apparatus 4. The first radar apparatus 3 is arranged in a left-hand corner of a rear bumper, and the second radar apparatus 4 is arranged in a right-hand corner of the same bumper.

The first radar apparatus 3 detects a detection range 7. The detection range 7 is defined by an azimuth angle α, which is bounded in FIG. 1 by two lines 7*a*, 7*b*.

Correspondingly, the second radar apparatus 4 has a detection range 8 which is defined by a corresponding azimuth angle α. The azimuth angle α is bounded by two lines 8*a*, 8*b*.

The azimuth angles α in the exemplary embodiment are approximately 170°. The detection ranges 7, 8 of the radar apparatuses 3, 4 overlap, with the result that an overlapping range 9 is provided. The overlapping range 9 is bounded in terms of angle by the lines 7*b*, 8*b*. In an exemplary embodiment, an angle β of aperture of the overlapping range 9 is approximately 70°.

In their respective detection ranges 7, 8, the radar apparatuses 3, 4 can locate objects. In particular, the radar apparatuses 3, 4 can determine a distance of an object from the respective radar apparatus 3, 4, a target angle and a relative speed of the object with respect to the motor vehicle 1. As is apparent from FIG. 1, the detection ranges 7, 8 of the radar apparatuses 3, 4 also comprise the respective blind spot areas of the motor vehicle 1, that is to say areas which the driver cannot see in the interior rear view mirror or in the exterior rear view mirrors.

Figure 2:
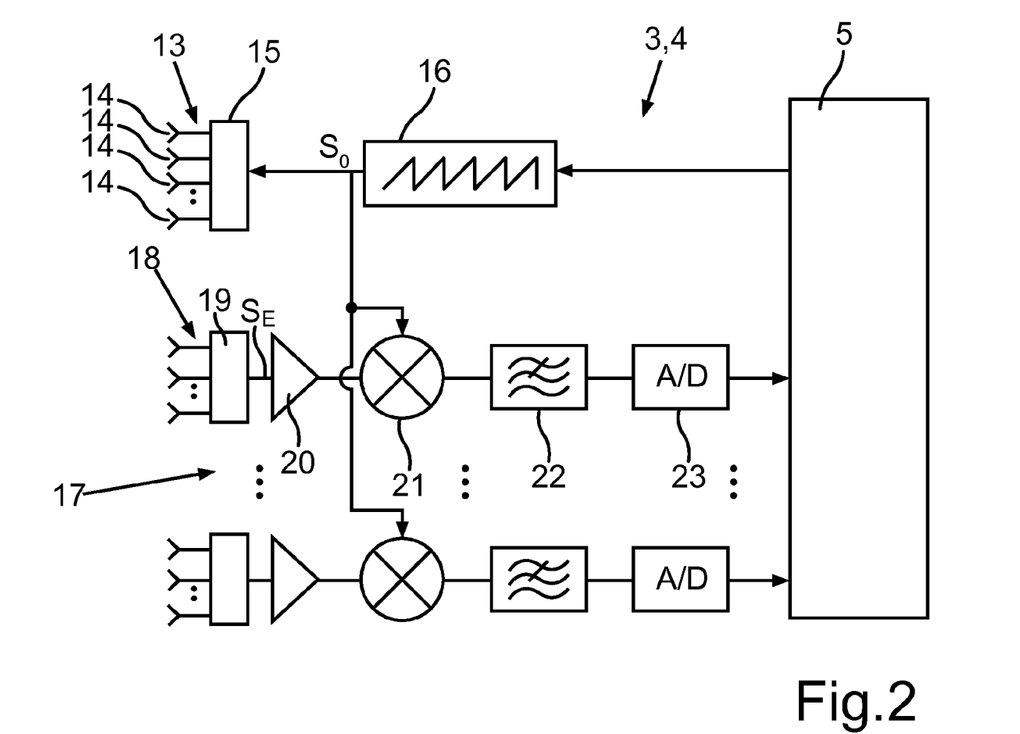
FIG. 2 is a block diagram of a radar apparatus such as is used in the motor vehicle according to FIG. 1.

FIG. 2 shows a block circuit diagram of an individual radar apparatus 3, 4 including a control device 5. The radar apparatus 3, 4 comprises a transmission antenna device 13 which comprises a group of antenna units 14 which are fed separately from one another. The individual antenna units 14 can each comprise a multiplicity of patch antennas (see FIG. 3). The transmission antenna device 13 is supplied via a supply circuit 15, specifically with the aid of a local oscillator 16. The latter generates a transmission signal $S_0$. The transmission signal $S_0$ is a frequency-modulated electromagnetic wave whose frequency has a saw-tooth-shaped profile in the exemplary embodiment. The transmission signal $S_0$ is therefore frequency-modulated; its frequency varies periodically between a first value, for example 23.8 GHz, and a second value, for example 24.2 GHz. The central frequency of the transmission signal $S_0$ is 24 GHz in the exemplary embodiment.

The local oscillator 16 is actuated by the control device 5. The oscillator 16 is, for example, a voltage-controlled oscillator which generates the transmission signal $S_0$ with such a frequency which is dependent on the amplitude of a direct voltage which is made available at the oscillator 15 by the control device 5.

The radar apparatus 3, 4 also comprises one or more receivers 17 (as illustrated schematically in FIG. 2). The latter comprises a reception antenna device 18, which can comprise a multiplicity of patch antennas in the exemplary embodiment. The reception antenna device 18 can also be a two-dimensional antenna matrix (array). The reception antenna device 18 is coupled to a supply circuit 13. The supply circuit 19 makes available a signal $S_E$ which is a reception signal. The received signal $S_E$ is amplified with the aid of a low-noise amplifier 20, down-mixed using a mixer 21, low-pass filtered using a low-pass filter 22 and subjected to analogue-to-digital conversion by means of an analogue-to-digital converter 23. In order to down-mix the received signal $S_E$, the transmission signal $S_0$ is used, and the transmission signal $S_0$ is conducted to the mixer 21, specifically, for example, using a directional coupler. The received digital signal $S_E$ is then processed using the control device 5. The control device 5 determines, for example, the distance from an object, its relative speed as well as a target angle from the signal $S_E$.

FIG. 2 is a basic illustration of the radar apparatus 3, 4 and shows the method of functioning of the radar apparatus 3, 4 in a merely schematic form. The radar apparatus 3, 4 is therefore represented in a merely exemplary form in FIG. 2.

The transmission antenna device 13 and, to be more precise, the supply circuit 15 can therefore be controlled in such a way that it illuminates in chronological succession by switching over various partial regions of the detection range 7 or 8. For example, for this purpose a transmission lobe of the transmission antenna device 13 can be swept electronically in the azimuthal direction, specifically according to the phase array principle. In this case, the reception antenna device 18 can have, in the azimuthal direction, a wide reception characteristic which covers the entire detection range 7 or 8. Other refinements can alternatively implement narrow reception angle ranges in conjunction with wide transmission lobes.

Figure 3:
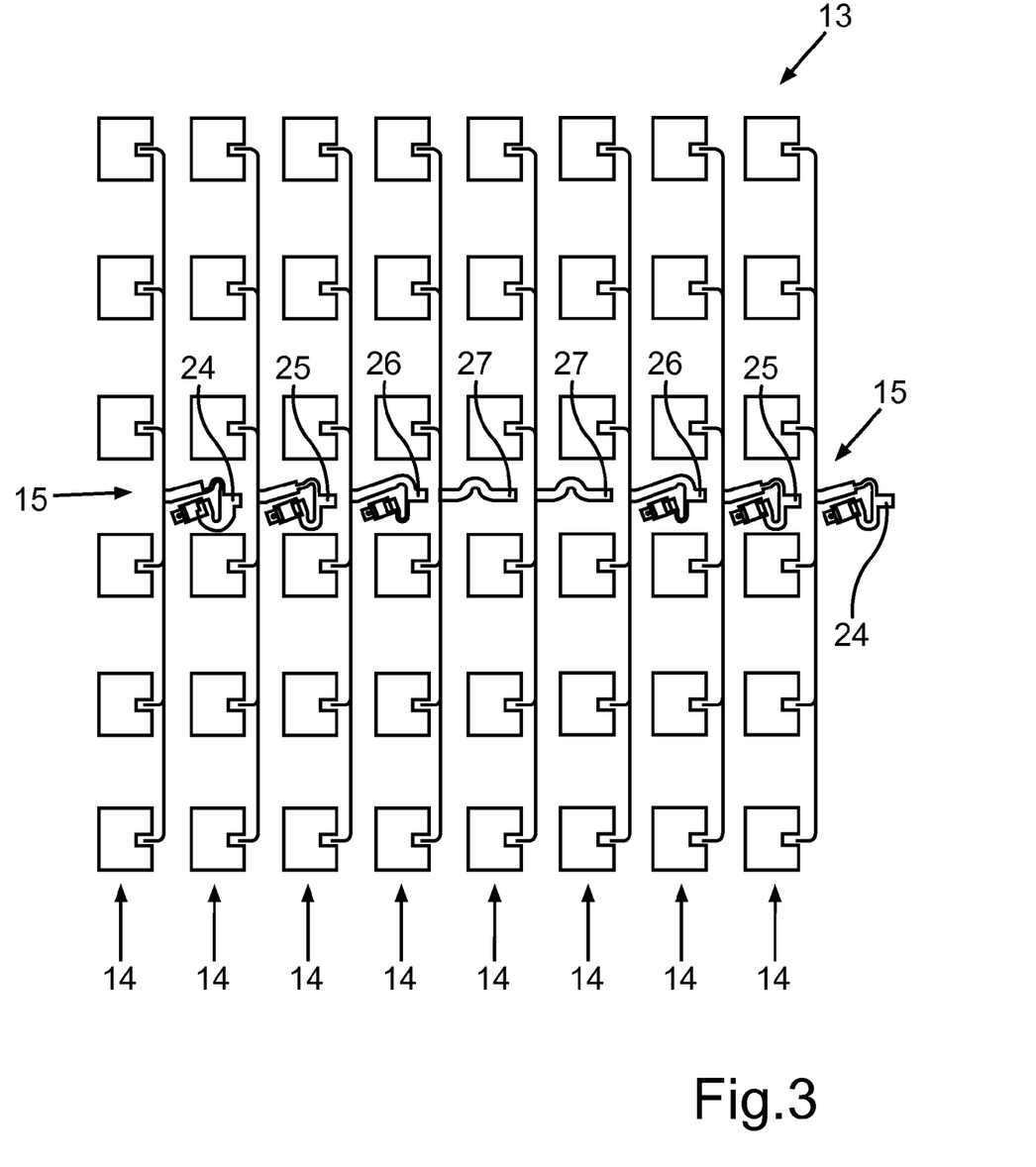
FIG. 3 is a schematic illustration of a transmission antenna device such as is used in the radar apparatus according to FIG. 2.

The emphasis here is on the supply circuit 15 of the transmission antenna device 13, specifically on its damping elements. Referring to FIG. 3, the transmission antenna device 13 includes, as already stated, a multiplicity of antenna units 14, which in turn have a multiplicity of individual patch antennas. To be precise, the transmission antenna device 13 in the exemplary embodiment includes eight antenna units 14 of identical design. Each antenna unit 14 comprises six patch antenna elements in the exemplary embodiments. All the patch antenna elements are mounted on a common substrate. Furthermore, the supply circuit 15, which is constructed in microstrip technology in the exemplary embodiment, is also mounted on this substrate.

The supply circuit 15 comprises, for each antenna unit 14, not only the two central antenna units 14 but also, in each case, a damping element via which the respective antenna unit 14 is coupled to the local oscillator 16. To be precise, the outermost antenna units 14 are each coupled to a damping element 24, and the antenna units which are adjacent to the outermost antenna units 14 are coupled to, in each case, a damping element 25, and the antenna units 14 which are adjacent to the central antenna units 14 are coupled to, in each case, a damping element 26. The damping elements 24, 25, 26 each have the same damping values on a paired basis:

The damping elements 24 have a first damping value, the damping elements 25 have a second damping value and the damping elements 26 have a third damping value. The first damping value is greater than the second damping value, and the second damping value is greater than the third damping value. All the damping elements 24, 25, 26 have the same phase properties, that is to say the phase of an electromagnetic wave which propagates via the damping elements 24, 25, 26 is shifted by the same absolute value. That is to say all the damping elements 24, 25, 26 have the same effective line length and therefore the same phase shift.

Figures 4A, 4B, 4C, 4D:
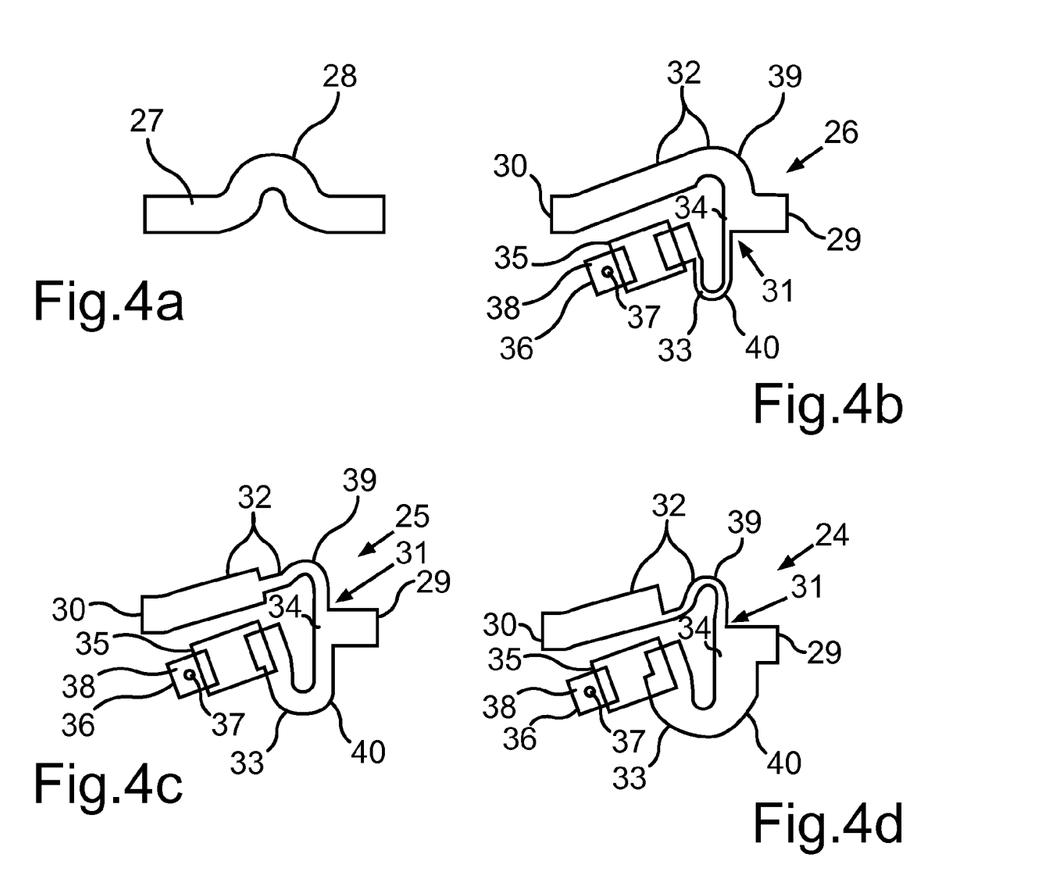
FIG. 4*a* is a schematic and repeatedly enlarged illustration of a wave line (layout) with adapted length or phase shift.
FIGS. 4*b* to 4*d* are a schematic and repeatedly enlarged illustration of, in each case, a damping element (layout) with a different damping value according to an embodiment of the invention.

The central antenna units 14 are not coupled to any damping elements but instead are coupled to the local oscillator 16, in each case via a microstrip line 27. Such a microstrip line 27 is shown in FIG. 4a. As is apparent from FIG. 4a, the microstrip line 27 has a loop-shaped profile with a meandering loop 28. As a result, the effective line length of the microstrip line 27 can be adapted to the effective length of the damping elements 24, 25, 26, specifically given the predefined available installation space. The phase shift as a result of the microstrip line 27 is therefore adapted to the phase shifts as a result of the damping elements 24, 25, 26. The microstrip line 27 is, on the one hand, connected to the assigned antenna unit 14; and on the other hand it is coupled to the local oscillator 16, for example via a coaxial cable or another waveguide.

The damping elements 24, 25, 26 according to an embodiment of the invention are shown in FIGS. 4b to 4d. The damping elements 24, 25, 26 are also made available in microstrip technology and therefore comprise the microstrip lines. A first gate or first terminal 29 of the respective damping elements 24, 25, 26 is coupled to the local oscillator 16, for example via a coaxial cable or another waveguide. A second gate 30 is connected to the respective antenna unit 14. The damping elements 24, 25, 26 each have a branching unit, specifically here a parallel branch 31 (T-junction) which has a first line branch 32 and a second line branch 33. The two line branches 32, 33 are combined at a branching point 34, specifically at the first gate 29. The first branch line 32 therefore couples the assigned antenna unit 14 to the local oscillator 16. A portion of the power of the transmission signal $S_O$ is tapped and conducted away via the second line branch 33. This tapped electromagnetic wave is conducted via a resistor 35 to a third gate 36 of the damping element 24, 25, 26, which gate 36 is connected to ground via an electrical short-circuiting element 37 (a via). The respective short-circuiting element 37 therefore extends perpendicularly with respect to the plane of the drawing and through the substrate. In the exemplary embodiment, the resistor 35 is a SMD component and bears, on the one hand, on a microstrip contact face 38 which is separated from the parallel branch 31, and, on the other hand, on an end region of the second line branch 33. The short-circuiting element 37 connects the microstrip contact face 38 to ground here.

The resistor 35 with the short-circuiting element 37 form in total a reflection-free terminating element.

The parallel branch 31 has two $\lambda/4$ transformers 39, 40 which have the function of adapting the input impedance to the output impedance. Through suitable selection of the impedances of the two $\lambda/4$ transformers it is possible to implement the desired power distributions of the parallel branch 31 and therefore the necessary damping values.

FIG. 4b shows that damping element 26 which serves to supply the antenna units 14 which are adjacent to the central antenna units 14. This damping element 26 has a low damping value—the $\lambda/4$ transformer 39 is significantly wider than the $\lambda/4$ transformer 40.

FIG. 4c shows that damping element 25 which has the second, central damping value. The $\lambda/4$ transformer 39 is then somewhat narrower than that according to FIG. 4b and also a little narrower than the $\lambda/4$ transformer 40 of the second line branch 33.

The damping element 24 shown in FIG. 4d is used to supply the outermost antenna units 14. It has the largest damping value; the $\lambda/4$ transformer 39 is correspondingly significantly narrower than the $\lambda/4$ transformer 40.

In principle, the damping elements 24, 25, 26 can also be implemented with directional couplers. A portion of the power of the transmission signal $S_O$ is then tapped using such a directional coupler and can also be conducted to a reflection-free terminating element.

Overall, a damping element 24, 25, 26 is therefore made available which, can be manufactured cost-effectively, extremely precisely with respect to the phase shift and the damping value, and can also be manufactured in a reproducible fashion in large numbers. No additional components, such as for example SMD components, have to be inserted into that line branch 32 via which the antenna unit 14 is supplied. As a result, the phase of the electromagnetic wave is not adversely affected either. A desired damping value can be precisely set by correspondingly selecting the width of $\lambda/4$ transformers 39, 40 without a large degree of expenditure.

The invention claimed is:

1. A driver assistance device for a vehicle having a radar apparatus for detecting objects which are external to the vehicle, the radar apparatus comprising:
   a transmitter;
   a receiver;
   an antenna unit; and
   a damping element having a first terminal configured to couple to the antenna unit and having a second terminal configured to couple to at least one of the transmitter or receiver, the damping element for directing and damping electromagnetic waves propagating between the first and second terminals thereof, wherein the damping element comprises a branching unit, the branching unit comprising:
    a first branch line having a first end coupled to the first terminal of the damping element and a second end corresponding to the second terminal of the damping element such that the first branch line is configured to direct damped electromagnetic waves between the antenna unit and at least one of the transmitter or receiver;
    a second branch line having a first end coupled to the first terminal of the damping element and a second end; and
    a terminating element coupled to the second end of the second branch line.

2. The driver assistance device according to claim 1, wherein said branching unit is provided from a plurality of strip transmission lines.

3. The driver assistance device according to claim 1 further comprising:
    a first quarter-wave transformer coupled between the first end of the first branch line and the first terminal of the damping element; and
    a second quarter-wave transformer coupled between the first end of the second branch line and the first terminal of the damping element.

4. The driver assistance device according to claim 1 wherein said branching unit comprises a directional coupler.

5. The driver assistance device according to claim 1, wherein said terminating element comprises a resistor coupled to a reference potential.

6. The driver assistance device according to claim 1 wherein said terminating element is an absorber which is electrically isolated from a reference potential.

7. The driver assistance device according to claim 1 wherein:
    the radar apparatus has at least two antenna units which can each be coupled via a specified one of a plurality of damping elements to at least one of the transmitter or receiver; and
    each of the damping elements is provided having a different damping value.

8. The driver assistance device of claim 1 wherein the vehicle comprises a motor vehicle.

9. A method for operating a radar apparatus of a driver assistance device in a vehicle wherein the radar apparatus includes an antenna, coupled to at least one of a transmitter and/or a receiver through a damping element, the method comprising:
    transmitting or receiving electromagnetic waves through the antenna of the radar apparatus;
    directing electromagnetic waves toward a damping element, wherein the electromagnetic waves are directed via a first branch line of a branching unit of the damping element between the antenna and one of the transmitter or receiver, and wherein the electromagnetic waves are directed toward a terminating element via a second branch line which is coupled to the first line branch.

10. The driver assistance device according to claim 2 wherein said strip transmission lines are implemented as microstrip transmission line such that the first and the second branch lines comprise a microstrip line.

11. The driver assistance device according to claim 4 wherein said branching unit comprises a transverse electromagnetic mode (TEM) line coupler, wherein the first branch line is arranged parallel to the second branch line and is electrically isolated from the second branch line.

12. A driver assistance device for a vehicle, the driver assistance device comprising:
    a radar apparatus for detecting objects which are external to the vehicle, with the radar apparatus comprising:
        a transmitter;
        a receiver;
        an antenna;
        a damping element having a first terminal configured to be coupled to at least one of the transmitter or receiver and a second terminal configured to be coupled to the antenna, said damping element for directing and damping electromagnetic waves propagating between the antenna and the at least one of the transmitter or receiver and wherein said damping element comprises:
            a branching unit having a first branch line for directing damped electromagnetic waves between at least one of the transmitter or receiver and said antenna unit and a second branch line having a first end coupled to the first branch line; and
            a terminating element coupled to a second end of said second branch line.

13. The driver assistance device according to claim 12 wherein said branching unit is implemented in strip conductor technology.

14. The driver assistance device according to claim 13 wherein said first and the second branch lines are provided as microstrip lines.

15. The driver assistance device according to claim 12 wherein said branching unit has a parallel branch, with the result that the first and the second branch lines are electrically coupled to one another.

16. The driver assistance device according to claim 12 wherein said branching unit comprises a directional coupler.

17. The driver assistance device according to claim 16 wherein said branching unit comprises a transverse electromagnetic mode (TEM) line coupler having the first branch line arranged parallel to and electrically isolated from the second branch line.

18. The driver assistance device according to claim 12 wherein said terminating element comprises a resistor having a first terminal coupled to a second end of said second branch line and a second terminal coupled to a reference potential.

19. The driver assistance device according claim 12 wherein said terminating element comprises an absorber which is electrically isolated from a reference potential.

20. The driver assistance device according to claim 12 wherein the radar apparatus comprises:
    at least two antennas; and
    a plurality of damping elements wherein each of the at least two antennas can be coupled via a specified one of said plurality of damping elements to the transmitter and/or receiver, and wherein each of the damping elements is provided having a different damping value.

* * * * *